United States Patent
Haffelder et al.

(10) Patent No.: US 7,559,413 B2
(45) Date of Patent: Jul. 14, 2009

(54) AUTOMATIC PARKING BRAKE

(75) Inventors: Joerg Haffelder, Bad Rappenau (DE); Dieter Blattert, Kirchheim/Neckar (DE); Guenther Hertlein, Fichtenberg (DE); Frank Baehrle-Miller, Schoenaich (DE)

(73) Assignee: Robert Bosch GmbH, Stuttgart (DE)

( * ) Notice: Subject to any disclaimer, the term of this patent is extended or adjusted under 35 U.S.C. 154(b) by 391 days.

(21) Appl. No.: 10/582,797

(22) PCT Filed: Nov. 19, 2004

(86) PCT No.: PCT/DE2004/002552
§ 371 (c)(1),
(2), (4) Date: Jun. 14, 2006

(87) PCT Pub. No.: WO2005/061294
PCT Pub. Date: Jul. 7, 2005

(65) Prior Publication Data
US 2007/0164602 A1 Jul. 19, 2007

(30) Foreign Application Priority Data
Dec. 19, 2003 (DE) .............. 203 19 903
Sep. 28, 2004 (DE) .............. 10 2004 046 871

(51) Int. Cl.
*F16D 55/16* (2006.01)
(52) U.S. Cl. ................... 188/72.8; 188/72.4
(58) Field of Classification Search ............ 188/72.3, 188/158–162, 170, 265, 72.4, 72.8
See application file for complete search history.

(56) References Cited

U.S. PATENT DOCUMENTS

| 3,688,875 | A | | 9/1972 | De Hoff et al. |
| 3,770,084 | A | * | 11/1973 | Hill .............................. 188/265 |
| 3,805,924 | A | | 4/1974 | Gambardella |
| 4,063,622 | A | * | 12/1977 | Coleman et al. ........ 188/153 R |
| 4,793,447 | A | * | 12/1988 | Taig et al. .................. 188/72.1 |
| 5,148,894 | A | | 9/1992 | Eddy, Jr. |
| 5,348,123 | A | * | 9/1994 | Takahashi et al. .......... 188/72.1 |
| 5,682,965 | A | * | 11/1997 | Prinzler ..................... 188/72.4 |
| 5,782,322 | A | * | 7/1998 | Hauck et al. ............... 188/72.4 |
| 5,971,110 | A | * | 10/1999 | Martin ....................... 188/72.1 |
| 6,249,737 | B1 | * | 6/2001 | Zipp .............................. 701/70 |
| 6,698,555 | B2 | * | 3/2004 | Schafer et al. ............. 188/170 |
| 7,134,533 | B2 | * | 11/2006 | Hashida ..................... 188/72.8 |

FOREIGN PATENT DOCUMENTS

| DE | 102 04 852 A1 | 8/2003 |
| EP | 0 063 871 A1 | 11/1982 |
| GB | 2 358 897 A | 8/2001 |
| WO | WO 92/06876 A1 | 4/1992 |

* cited by examiner

*Primary Examiner*—Christopher P Schwartz
(74) *Attorney, Agent, or Firm*—Ronald E. Greigg

(57) ABSTRACT

The present invention relates to an automatic parking brake, including a brake piston, an auxiliary piston, a hydraulic chamber disposed between the brake piston and the auxiliary piston, a spring element, for prestressing the auxiliary piston, a spindle device connected to the auxiliary piston via a threaded connection, and a drive for the spindle device, wherein in a locked state of the parking brake, the brake piston is mechanically locked via the spindle device and the spring-loaded auxiliary piston, and in a released state of the parking brake, the auxiliary piston is blocked by means of the spring element and/or by means of the spindle device.

20 Claims, 4 Drawing Sheets

AUTOMATIC PARKING BRAKE

CROSS-REFERENCE TO RELATED APPLICATIONS

This application is a 35 USC 371 application of PCT/DE 2004/002552 filed on Nov. 19, 2004.

BACKGROUND OF THE INVENTION

1. Field of the Invention

The present invention relates to an automatic parking brake for keeping a vehicle parked and to an improved method for actuating an automatic parking brake.

2. Description of the Prior Art

Parking brakes are known in various versions in the prior art. Until now, vehicles have often used a mechanical parking brake, in which the driver actuates the parking brake of the vehicle via a grip bar and a cable. Recently, automatic parking brakes have also been proposed, in which the driver actuates the parking brake simply be pressing a button. The driver's wishes regarding the parking brake are delivered to a controller, which drives an electric motor, for instance, located on the brake piston in order to carry out the driver's wishes. It has proved disadvantageous, however, that because of an additional increase in volume, the parking brake has an influence on the service brake system. Moreover, in automatic parking brakes known at present, sensors are used for determining the position of the parking brake at the time, that is, the blocked state or the released state.

SUMMARY AND ADVANTAGES OF THE INVENTION

The automatic parking brake of the invention has the advantage over the prior art that it makes a simple, economical construction possible. The automatic parking brake of the invention furthermore has no influence on the service braking, and in particular there is no additional increase in volume caused by the parking brake in a normal service braking event. This is attained according to the invention in that the automatic parking brake has a brake pistons an auxiliary piston, a hydraulic chamber disposed between the brake piston and the auxiliary piston, a spring element for prestressing the auxiliary piston, a spindle device connected to the auxiliary piston via a threaded connection, and a drive for the spindle device. The brake piston is preferably the same brake piston that is used by the service brake of the vehicle as well. In the locked state of the parking brake, the brake piston is mechanically locked via the spindle device and the spring-loaded auxiliary piston. In a released state of the parking brake, the auxiliary piston is fixed by means of the spring element and/or by means of the spindle device.

The drive of the spindle device is preferably an electric motor. Alternatively, a hydraulic drive or a hydraulic motor or a magnetic drive can also be used as the drive.

Especially preferably, the automatic parking brake of the invention includes a diagnosis device for determining a locked state of the parking brake. The diagnosis device includes a detection device for detecting a motor current consumed by the electric motor during the locking operation or release operation. On the basis of the motor current consumption over time, a diagnosis can thus be made of the state (that is, parking brake locked or parking brake released). According to the invention, a complicated additional sensor array can be dispensed with.

Preferably each time the automatic parking brake is actuated, a blocking current of the electric motor is determined before the actual actuation of the parking brake. This value of the short-circuiting current is used as a reference value for the diagnosis device. Determining the blocking current can be done upon locking the parking brake and/or upon releasing the parking brake.

The automatic parking brake of the invention need not be operated with a readjustment mechanism to compensate for lining wear, since it can take on this compensation task itself. However, it should be noted that the automatic parking brake of the invention can also be used with the known readjustment mechanisms.

Also preferably, the spindle is disposed in an air-filled chamber. As a result, the spindle can be prevented from coming into contact with the brake fluid, and therefore no special demands need to be made of the spindle device.

A sealing element on the brake piston for sealing off the hydraulic chamber from the environment is preferably also embodied as a restoring element for the brake piston. Thus the sealing element takes on not only the sealing function but also a restoring function for the brake piston. The sealing element may be embodied as a sealing cuff, for example.

To prevent the spindle device of the automatic parking brake from seizing, a device for preventing seizing of the spindle device is preferably provided.

The device for preventing seizing preferably includes both an element that protrudes from a head of the spindle device and an elastic element. To keep friction as slight as possible, the protruding element on the head of the spindle device is preferably a ball.

In another preferred embodiment of the present invention, the device for preventing seizing of the spindle device is a stop. The stop includes a first element and a second element. The first element is disposed on a head of the spindle device, and the second element is disposed on a housing part of the parking brake. In a stop position, the first element and the second element are jointly in contact with a stop face, and the stop face is perpendicular to a direction of rotation of the spindle device. The stop is disposed such that in the stop position, an interstice exists between the upper end face of the head of the spindle device and the housing part of the parking brake, so that seizing of the spindle device at its head can be prevented.

The height of the first and second element of the stop is preferably less than one thread pitch of the spindle device. This reliably prevents the head of the spindle device from coming into contact with the housing component of the parking brake, where it could seize.

The method according to the invention for actuating an automatic parking brake includes the steps of actuating the spindle device until it contacts the brake piston, then building up a hydraulic pressure in the hydraulic chamber between the brake piston and the auxiliary piston in order to move the brake piston in such a way that the brake is put in the locked state, and to move the auxiliary piston, connected to the spindle, in an opposite direction from the brake piston, as a result of which the spindle is spaced apart from the brake piston. In the next step, the spindle device is actuated once again, until the spindle device again contacts the brake piston, so that the position of the brake piston is mechanically fixed via the spindle device and the auxiliary piston. Next, the hydraulic pressure in the hydraulic chamber is reduced. If the brake piston of the service brake of the vehicle is used as the brake piston of the parking brake, which is especially advantageous since in that case no additional components are necessary, then it is assured according to the invention that during the locking operation of the parking brake, only a certain hydraulic volume is employed. Once the parking brake is locked, the hydraulic pressure in the hydraulic chamber is reduced again, so that in the locked state of the parking brake, no hydraulic fluid from the brake circuit of the service brake has to be used. If settling effects occur at the components of the automatic parking brake after the pressure reduction in the hydraulic chamber, they can be compensated for by the spring that acts on the auxiliary piston. The spring furnishes a certain elasticity of the system. The spring is moreover designed such that if only a slight change in the length of the spring occurs, the spring force changes only minimally, if at all.

In the method of the invention, the spindle device is preferably driven by an electric motor. A diagnosis of the state of the parking brake, that is, whether the parking brake is in the locked state or the released state, is made on the basis of a motor current consumed by the electric motor. A motor current consumption over time can be compared with comparison values stored in memory. The comparison values may be permanently stored in a memory, or the values from a previous actuation of the parking brake can be used as comparison values.

In the method of the invention, before the onset of the actuation of the spindle for locking and/or release of the parking brake, the spindle device is also preferably driven in an opposite direction from the actuation direction, so that the spindle device strikes a component, and a magnitude of a blocking motor current can be determined. This blocking motor current can then be used directly in the diagnosis process in evaluating the motor current graph of the electric motor during the actuation of the parking brake.

The release of the locked parking brake is preferably done such that first, a hydraulic pressure is built up between the brake piston and the auxiliary piston, and the electric motor for actuating the spindle device is operated with a continuously increasing driving force. Since the auxiliary piston is spring-loaded by the spring element, the spindle device does not begin to rotate in the auxiliary piston until the pressure force in the hydraulic chamber is equal to or somewhat greater than the spring force. As a result, it can continue to be assured that optimal efficiency can be attained upon the release of the parking brake, since an optimal motor current can be used for driving the spindle device. The spindle device is driven until it strikes a component. The hydraulic pressure in the hydraulic chamber is then reduced, causing the brake piston and the auxiliary piston to move toward one another. Since the spindle device is connected to the auxiliary piston via the threaded connection, the spindle device comes out of contact with the component again. Once the hydraulic fluid is drained out of the hydraulic chamber, the spindle is driven yet again, until it is again in contact with the component. As a result, the parking brake is shifted into a released state.

It should be noted that upon release, a restoring force can additionally be exerted on the brake piston, to reinforce a restoration of the brake piston. To that end, a separate restoring element may be provided, or the restoration is done by means of a sealing element, which seals off the hydraulic chamber from the environment surrounding the brake piston. The sealing element may be embodied as a cuff, for instance.

The automatic parking brake of the invention and the method of the invention for actuating the automatic parking brake can be implemented simply and economically. In particular, a diagnosis process can easily be integrated, so that a complicated sensor array can be dispensed with. Furthermore, a manual emergency release device can also be provided, by providing for a manual actuation of the spindle device. It can moreover be assured that unintentional locking and release of the parking brake will not happen, since releasing or locking each require separate triggering of the drive, in particular the electric motor. Since the automatic parking brake of the invention does not use any tapering surfaces and thus does not utilize any wedge actions, it can be operated regardless of changing friction conditions. As a result, the operating safety can be improved markedly, and a long service life can be assured.

Since moreover the auxiliary piston is secured by the spindle device in the unused state of the parking brake, the parking brake of the invention has no influence on the actual service braking of the vehicle, since no additional volumetric increase because of the parking brake is necessary. Since in the released state of the parking brake, the spring-loaded auxiliary piston is preferably already in the terminal position, unintentional locking does not occur.

BRIEF DESCRIPTION OF THE DRAWINGS

Exemplary embodiments of the invention are described in further detail in the ensuing description, taken in conjunction with the drawings, in which.

DESCRIPTION OF THE PREFERRED EMBODIMENTS

Figure 1:
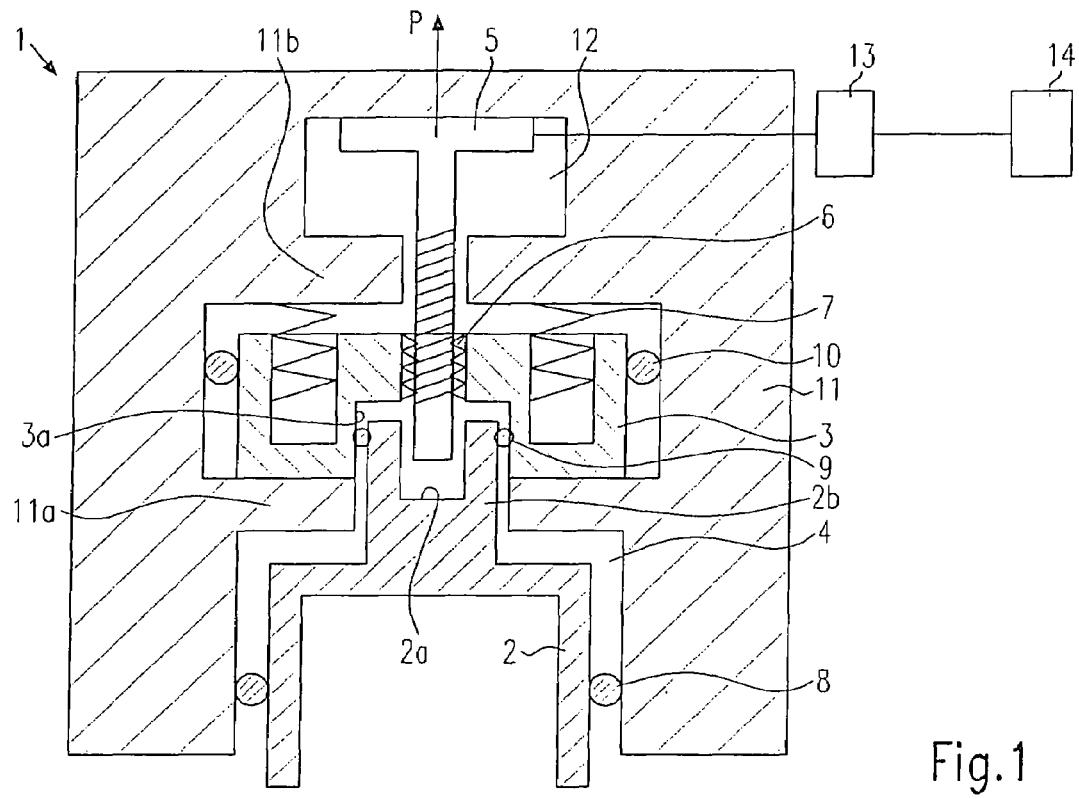
FIG. 1 a schematic sectional view of an automatic parking brake in a first exemplary embodiment of the present invention, in a state before the onset of a locking operation.

In conjunction with FIGS. 1-6, an automatic parking brake 1 in a first exemplary embodiment of the invention will first be described below.

As can be seen from FIGS. 1-5, the parking brake 1 of the invention includes a brake piston 2, an auxiliary piston 3, and a hydraulic chamber 4 disposed between the brake piston 2 and the auxiliary piston 3. A spindle 5 is also provided, which is connected to the auxiliary piston 3 via a threaded connection 6. A spring element 7 is disposed between the auxiliary piston 3 and a housing part 11 of the parking brake and exerts a spring force on the auxiliary piston 3 in such a way that the auxiliary piston 3 is pressed downward in the direction of the brake piston 2. The auxiliary piston rests on a housing region 11a, if the parking brake is in a released state.

As can be seen from FIGS. 1-5, the hydraulic chamber 4 is sealed off by means of three sealing elements 8, 9 and 10. More precisely, the sealing element 8 seals off the brake piston 2 from the environment outside it in the direction of a brake disk, not shown. The sealing element 9 is disposed between the brake piston 2 and the auxiliary piston 3, and the sealing element 10 is disposed between the auxiliary piston 3 and the housing part 11 of the parking brake. The two sealing elements 9 and 10 seal off the hydraulic chamber 4 from a chamber 12 in which the spindle 5 and the spring element 7 are disposed. It is thus assured that the spindle 5 and the spring element are located outside the hydraulic fluid. However, it should be noted that in principle, operation of the spindle 5 in the hydraulic fluid is also possible. It is also noted that a line for supplying and for emptying the hydraulic chamber 4 is not shown in FIGS. 1-5, for the sake of greater clarity.

In the brake piston 2, on its side oriented toward the auxiliary piston 3, there is also a region 2b of reduced diameter, in which a blind bore 2a is shown. The blind bore 2a serves for instance to receive part of the spindle 5 and forms a stop for the spindle.

A stepped through bore 3a is formed in the auxiliary piston 3, and part of the stepped bore furnishes the threaded connection 6 to the spindle. The part 2b of the brake piston 2 of smaller diameter is received in the region of the stepped bore 3a having the larger diameter. The sealing element 9 is also disposed in this region. The maximum difference in the strokes of the brake piston 2 and the auxiliary piston 3 is determined by the depth of the first step of the stepped bore 3a.

Thus for keeping the vehicle parked, the automatic parking brake 1 of the invention uses the same brake piston 2 that is also used by the normal service brake of the vehicle. The number of parts needed for the automatic parking brake can thus be reduced. The parking brake of the invention thus has a compact construction.

The sealing element 8 is embodied as a sealing cuff and exerts a restoring force on the brake piston 2 in the direction of the auxiliary piston 3, as soon as the brake piston 2 moves downward from its outset position shown in FIG. 1.

The spindle 5 is driven via an electric motor 13, shown only schematically. The electric motor 13 is connected to a diagnosis device 14. The diagnosis device 14 uses the motor current consumed by the electric motor for diagnosing the state the automatic parking brake 1 is in. In particular, the diagnosis device 14 ascertains whether the parking brake 1 is in the locked state or the parking brake 1 is in the released state, once an actuation command for the parking brake has accordingly been issued, for instance by the driver by pressing a button. The electric motor 13 can either be connected directly to the spindle 5, or a gear can be connected between the electric motor 13 and the spindle 5.

The method for actuating the automatic parking brake 1 of the invention will be described below. FIG. 1 shows the outset position of the parking brake 1, in which the parking brake 1 is in the unlocked or released state.

Figure 6:
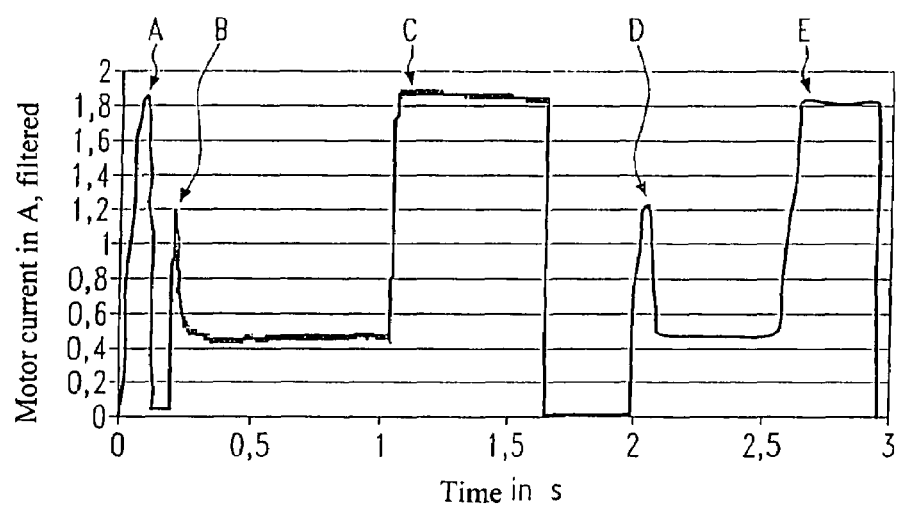
FIG. 6, a graph which shows the current consumption over time of an electric motor for driving the parking brake.

Beginning at the unlocked state of the parking brake, shown in FIG. 1, the electric motor 13 is first operated in such a way that the spindle 5 is pressed in the direction of the arrow P toward the housing part 11. This step prior to the actual actuation of the parking brake serves to determine a blocking current of the electric motor 13. As the graph in FIG. 6 shows, the electric motor 13 is operated only briefly, to ascertain the maximum blocking current. In FIG. 6, the determination of the blocking current is represented by the letter A. In this exemplary embodiment, the maximum motor current is approximately 1.9 A.

Figure 2:
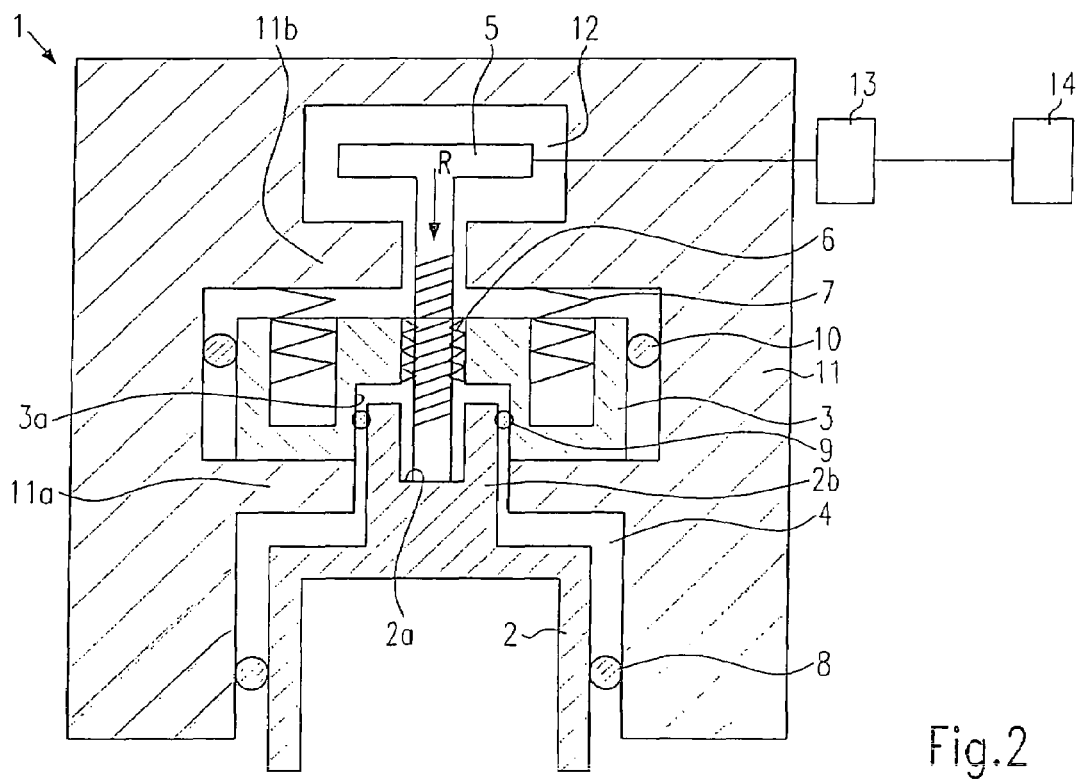
FIG. 2, a schematic sectional view of the parking brake in a second position during the locking operation.

Once the maximum blocking current is ascertained, the electric motor is stopped and is operated in the opposite direction, to move the spindle 5 in the direction of the arrow R (see FIG. 2). In FIG. 6, the onset of the actuation of the spindle 5 in the opposite direction to arrow P is represented by the letter B. The spindle 5 rotates in the direction of the arrow R until it rests on the bottom of the blind bore 2a. Since the auxiliary piston 3 rests on the housing region 11a, and a communication of the hydraulic chamber 4 with a hydraulic reservoir is interrupted, the spindle 5 cannot move any farther in the direction of the arrow R. As a result, the motor current consumed by the electric motor 13 increases to its maximum value again, as represented in FIG. 6 at C. This state is shown in FIG. 2.

Figure 3:
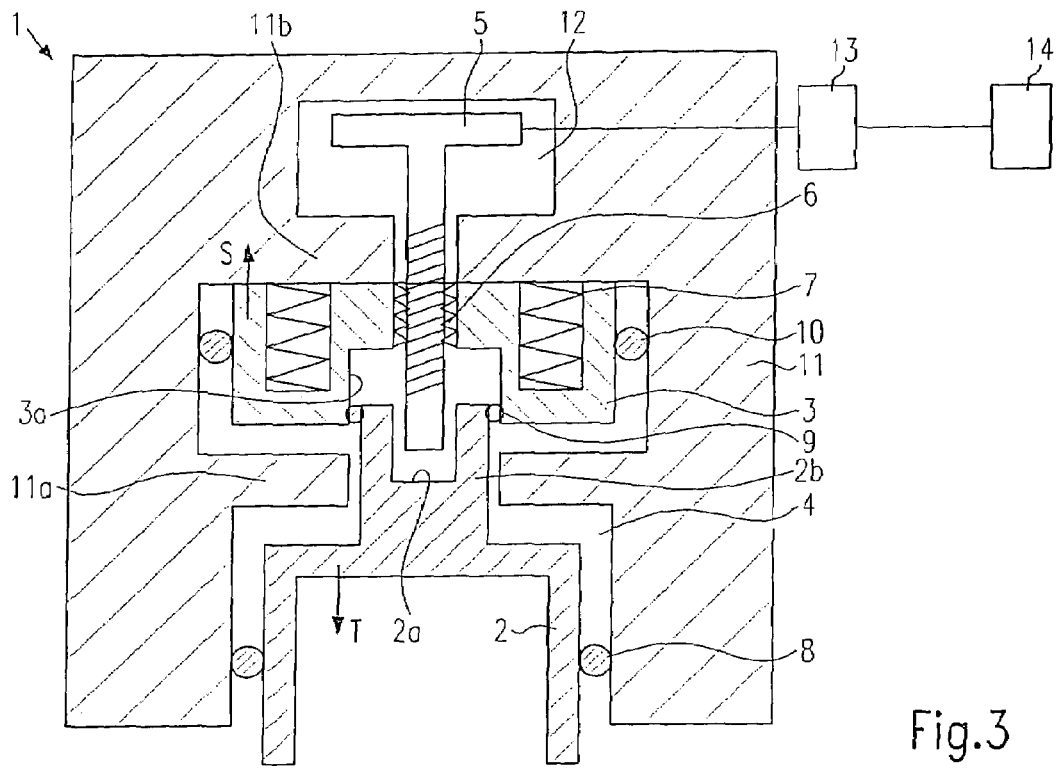
FIG. 3, a schematic sectional view of the parking brake in a third position during the locking operation.

When the controller finds that the spindle 5 is resting on the brake piston 2, the electric motor is shut off, and hydraulic fluid is delivered into the hydraulic chamber 4. As a result, the auxiliary piston 3 moves upward in the direction of the arrow S until it rests on the housing region 11b and the brake piston 2 moves downward in the direction of the arrow T, in order to execute the locking of the brake. This state is shown in FIG. 3. Since the spindle 5 is firmly connected to the auxiliary piston 3 via the threaded connection 6, the spindle 5 is moved upward as well.

Figure 4:
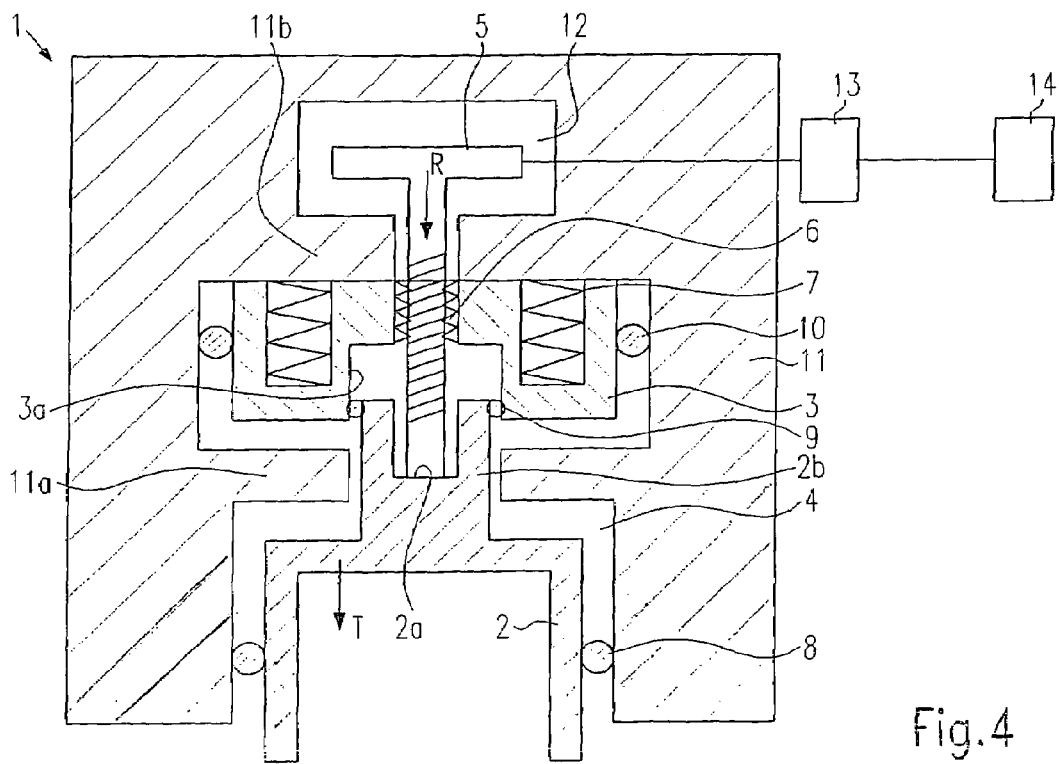
FIG. 4, a schematic sectional view of the parking brake in a fourth position during the locking operation.

To attain a mechanical locking of the parking brake, the electric motor 13 is operated again, so that the spindle 5 is moved back downward in the direction of the arrow R (see FIG. 4). The onset of this new actuation of the electric motor 13 is marked in FIG. 6 by the letter D. The spindle is moved downward until it again rests on the brake piston 2, or more precisely in the blind bore 2a. This state is shown in FIG. 4 and is marked in FIG. 6 by the letter E. The electric motor 13 is then shut off again. The brake piston 2 is thus mechanically fixed in its position via the spindle 5 around the auxiliary piston 3 on the housing part 11.

Figure 5:
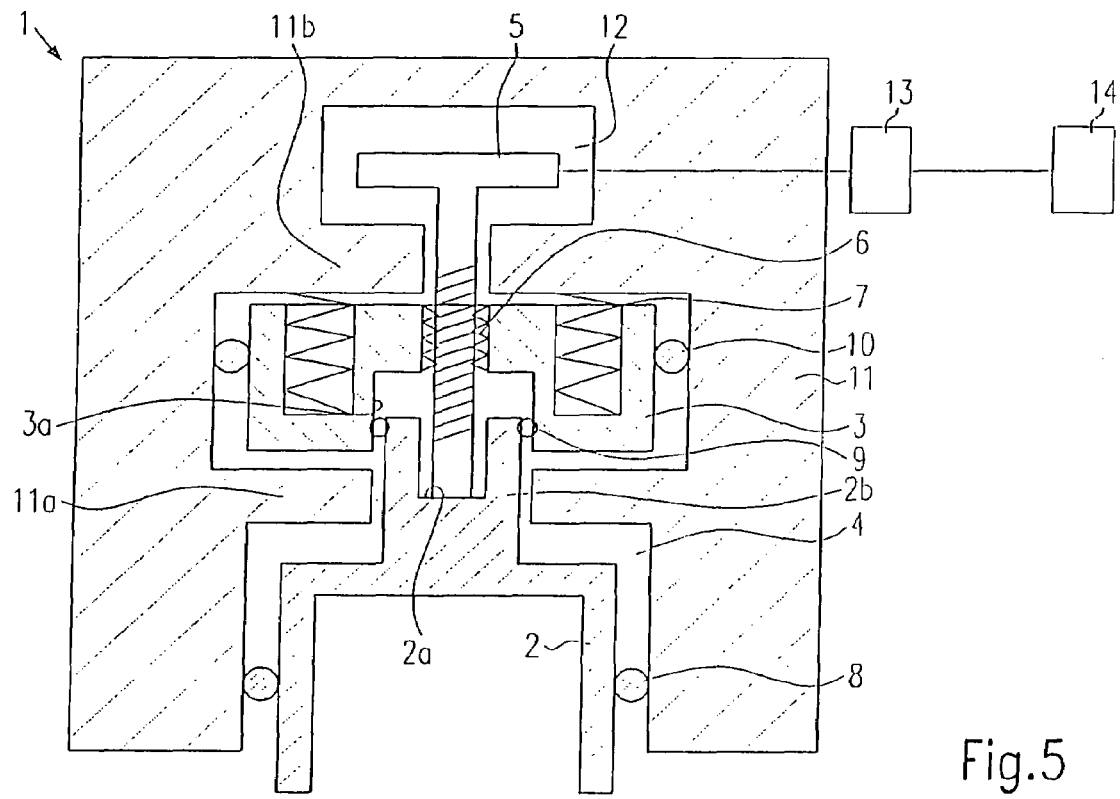
FIG. 5, a schematic sectional view of the parking brake in a locked state.

Next, the hydraulic fluid is drained out of the hydraulic chamber 4. This state is shown in FIG. 5. Because of settling between the individual components and play in the threaded connection 6, the auxiliary piston 3 may move downward somewhat. This is shown in exaggerated fashion in FIG. 6 for the sake of greater clarity. However, since the spring element 7 is disposed between the auxiliary piston 3 and the housing part 11, or more precisely the housing region 11b, the position of the brake piston 2 is not changed; instead, the spring element 7, by its spring force, presses against the brake piston 2 via the auxiliary piston 3 and the spindle 5. A mechanical fixation of the brake piston 2 is thus assured, despite any play or settling that may be present.

The automatic parking brake can thus make the braking position of the brake piston 2 possible without using hydraulic fluid from the service brake circuit. Moreover, during the locking operation, the spindle 5 always rotates in the same direction of rotation, and therefore any play that may exist in the spindle upon a reversal of direction will not cause any deviation. Moreover, any lining wear that may occur in the brake can easily be compensated for by means of a lengthened spindle stroke. Because of the use of the spring element 7, there is also a certain elasticity of the system in the event of settling.

To release the parking brake 1, beginning in FIG. 5, hydraulic fluid is first delivered into the hydraulic chamber 4. The electric motor 13 is then supplied with current, such that it attempts to rotate the spindle 5 upward. Since via the spring element 7 and the auxiliary piston 3 a very strong spring force is being exerted on the spindle 5, the electric motor is at first unable to move the spindle. Not until the pressure in the hydraulic chamber 4 becomes greater than the spring force of the spring element 7 exerted via the auxiliary piston 3 is the spindle 5 relieved, and the auxiliary piston 3 is pressed upward by a slight amount, until it once again rests on the housing region 11b. As soon as the pressure in the hydraulic chamber 4 becomes somewhat greater than the spring force, the spindle 5 begins to rotate upward. The spindle 5 is rotated until it strikes the housing part 11 and the electric motor 13 is again consuming the blocking current. Once that has been ascertained, the pressure in the hydraulic chamber 4 can be reduced again, so that the auxiliary piston 3 and the brake piston 2 move toward one another again. In the process, the auxiliary piston 3 is moved by the spring element 7, and the brake piston 2 is restored to its outset position by means of a restoring function of the sealing element 8. The spindle 5 is now spaced apart somewhat from the housing part 11.

By means of the various graphs of the current consumption of the electric motor 13 over time, a diagnosis can easily by performed by means of the diagnosis device 14 of the parking brake. The functional sequence of the locking and release operations can be determined from the behavior of the current consumption of the electric motor. Sensors can therefore be dispensed with.

It should be noted that for safety reasons, it is understood that still other methods, such as an unlock test or a PV test, can be performed in order to determine the locked state.

Figure 7:
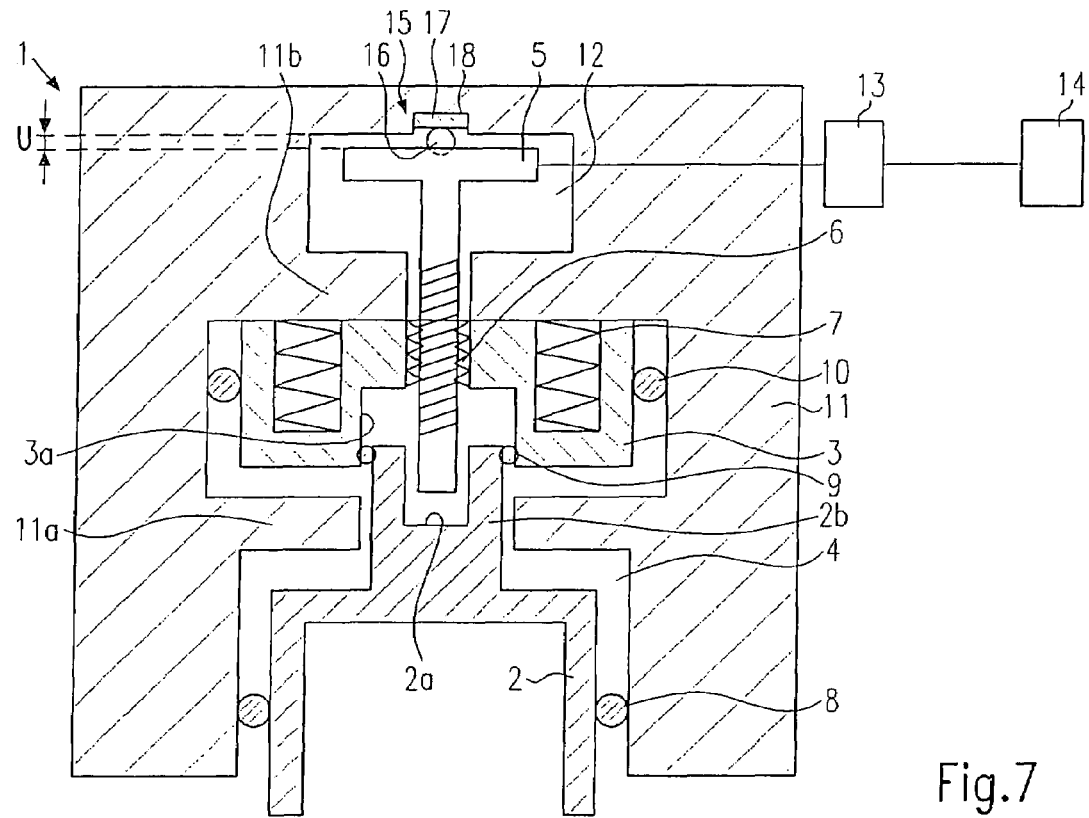
FIG. 7, a schematic sectional view of an automatic parking brake in a second exemplary embodiment of the present invention.

FIG. 7 shows an automatic parking brake in a second exemplary embodiment of the invention. Elements that are the same or functionally the same are identified by the same reference numerals as in the first exemplary embodiment.

Unlike the first exemplary embodiment, the parking brake 1 of the second exemplary embodiment additionally has a device 15 for preventing seizing of the spindle device 5. As FIG. 7 shows, the device 15 for preventing seizing includes a ball 16 and an elastomer 17. The ball 16 is disposed in a head region of the spindle device 5. The elastomer 17 is disposed in a recess 18 formed in the housing part 11. The motion of the spindle 5 is thus prevented by the device 15 for preventing seizing. Thus a gap U between the head of the spindle device 5 and the housing component is assured, so that no friction is possible between the head of the spindle device 5 and the housing part 11. The ball 16 and the elastomer 17 thus form a stop for the spindle device 5. The transmission of force to the housing part 11 in the loaded state is effected via the threaded connection 6 between the spindle 5 and the housing part 11. The gap U between the head of the spindle 5 an the housing part 11 is large enough to prevent contact between the spindle head and the housing part even in the event of thermal expansion of the components. Thus a release in the loaded state is possible at all times through the gap U. Since the element disposed on the spindle 5 is embodied as a ball 16, contact between the ball 15 and the elastomer 17 is minimized, and hence only minimal friction occurs between the ball 15 and the elastomer 17. Otherwise, this exemplary embodiment is equivalent to the exemplary embodiments described above, and so reference may be made to their description.

Figure 8:
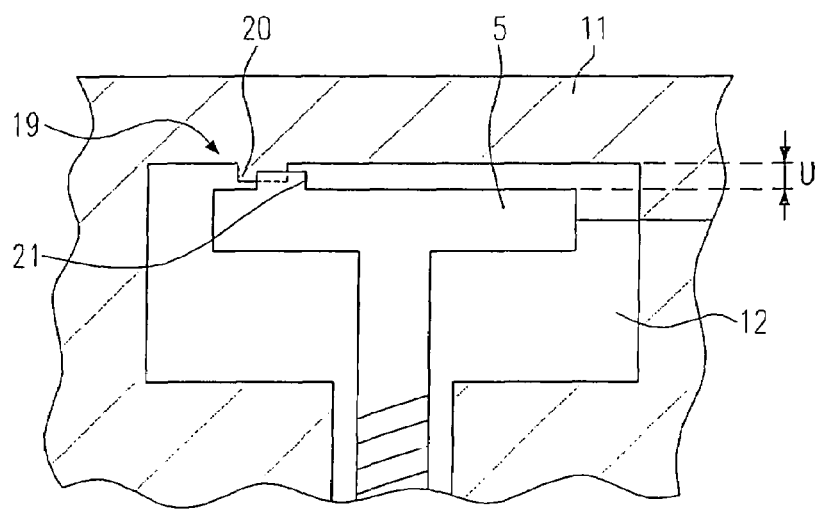
FIG. 8, a schematic sectional view of an automatic parking brake in a third exemplary embodiment of the present invention.

FIG. 8 shows an enlarge detail of a parking brake in a third exemplary embodiment of the present invention. Elements that are the same or functionally the same are identified by the same reference numerals as in the other exemplary embodiments above.

The third exemplary embodiment is substantially equivalent to the second exemplary embodiment and likewise has a device 15 for preventing seizing of the spindle 5. Unlike the second exemplary embodiment, however, in the third exemplary embodiment the device for preventing seizing is embodied as a stop 19. As FIG. 8 shows, the stop 19 includes a first element 20 and a second element 21. The first element 20 is an integral region, formed on the housing part 11, that protrudes into the spindle chamber 12. The second element 21 is a protruding region, formed on the head of the spindle 5, that protrudes outward from the head of the spindle 5. The height of the first element and of the second element of the stop 19 is selected such that in the state of contact between the first element 20 and the second element 21, a stop face is formed that is perpendicular to a circumferential direction of rotation of the spindle 5. As a result, further rotation of the spindle 5 is prevented, so that the head region of the spindle 5 cannot come into contact with the housing part 11. As a result, once again the gap U between the head of the spindle 5 and the housing part 11 can be maintained, so that no friction occurs between these two parts. This prevents seizing of the spindle 5 on the housing part 11.

The height of the stop, that is, of the second element 21 on the spindle 5, is selected such that it is less than one thread pitch of the threaded connection 6, or in other words shorter than the distance which the spindle 5 travels upon the full revolution in the direction of the spindle axis. Otherwise, the third exemplary embodiment is equivalent to the previous exemplary embodiment, the description of which above can therefore be referred to.

The foregoing relates to a preferred exemplary embodiment of the invention, it being understood that other variants and embodiments thereof are possible within the spirit and scope of the invention, the latter being defined by the appended claims.

The invention claimed is:

1. An automatic parking brake, including
a brake piston,
an auxiliary piston,
a hydraulic chamber disposed between the brake piston and the auxiliary piston,
a spring element, for prestressing the auxiliary piston,
a threaded connection disposed in a through bore of the auxiliary piston,
a spindle device connected to the auxiliary piston via the threaded connection and able to be applied directly against the brake piston, and
a drive for the spindle device,
wherein in a locked state of the parking brake, the brake piston is mechanically locked via the spindle device and the spring-loaded auxiliary piston, and
in a released state of the parking brake, the auxiliary piston is blocked by means of the spring element and/or by means of the spindle device.

2. The parking brake in accordance with claim 1, wherein the drive comprises an electric motor.

3. The parking brake in accordance with claim 2, further comprising a diagnosis device for determining a locked and/or released state of the parking brake, the diagnosis device being operable to determine the state of the parking brake on the basis of a motor current consumed by the electric motor.

4. The parking brake in accordance with claim 3, further comprising a detection device, for ascertaining a blocking current of the electric motor before each locking operation and/or before each release operation.

5. The parking brake in accordance with claim 2, further comprising a detection device, for ascertaining a blocking current of the electric motor before each locking operation and/or before each release operation.

6. The parking brake in accordance with claim 1, further comprising a device for preventing seizing of the spindle device.

7. The parking brake in accordance with claim 6, wherein the device for preventing seizing of the spindle device comprises both an element that protrudes from a head of the spindle device and an elastic element.

8. The parking brake in accordance with claim 7, wherein the elastic element is a spring or an elastomer.

9. The parking brake in accordance with claim 1, wherein wear of a brake lining can be compensated for by a lengthened stroke of the spindle device.

10. The parking brake in accordance with claim 1, wherein the spindle device is disposed in an air-filled chamber.

11. The parking brake in accordance with claim 1, further comprising a sealing element on the brake piston for sealing off the hydraulic chamber, the sealing element also acting as a restoring element for the brake piston.

12. A method for actuating an automatic parking brake, having a brake piston and a spring-loaded auxiliary piston that is connected to a spindle device via a threaded connection the method comprising the following steps:
- actuating the spindle device, until the spindle device contacts the brake piston;
- building up a hydraulic pressure in a hydraulic chamber disposed between the brake piston and the auxiliary piston, when the spindle device contacts the brake piston, in order by means of the brake piston to shift the parking brake into a locked state, and in order to move the auxiliary piston, connected to the spindle device, in an opposite direction, whereupon the spindle device is spaced apart from the brake piston;
- actuating the spindle device again, until the spindle device again contacts the brake piston and the position of the brake piston is mechanically fixed via the spindle device and the auxiliary piston; and
- reducing the hydraulic pressure in the hydraulic chamber.

13. The method in accordance with claim 12, wherein the auxiliary piston is acted upon by the spring force of the spring element, in order to keep the brake piston in its locked position.

14. The method in accordance with claim 12, wherein that the spindle device is driven by means of an electric motor, and a diagnosis of the state of the parking brake is made on the basis of a motor current consumed by the electric motor, by means of a diagnosis device.

15. The method in accordance with claim 12, wherein, before a locking and/or release of the parking brake, the spindle device is moved toward a component in a direction counter to the actuation direction of the spindle device in order to determine a magnitude of a blocking current of the electric motor.

16. The method in accordance with claim 12, wherein, for releasing the locked parking brake, a hydraulic pressure in the hydraulic chamber is built up; the spindle device is actuated in order to move it away from the brake piston, and the spindle device does not rotate until a pressure in the hydraulic chamber is equal to or greater than a spring force of the spring element, and the spindle device is moved until it comes into contact with a housing part and after the spindle device contacts the housing part, the hydraulic pressure in the hydraulic chamber is reduced, as a result of which the brake piston and the auxiliary piston move in the direction toward one another, so that the spindle device connected to the auxiliary piston via the threaded connection comes out of contact with the housing part.

17. The method in accordance with claim 12, wherein, after the reduction of the hydraulic pressure, the spindle device is driven again, until it once again comes into contact with the housing part, in order to assure a mechanical fixation of the auxiliary piston in the released state of the parking brake.

18. An automatic parking brake, including a brake piston, an auxiliary piston, a hydraulic chamber disposed between the brake piston and the auxiliary piston, a spring element, for prestressing the auxiliary piston, a spindle device connected to the auxiliary piston via a threaded connection, a drive for the spindle device, wherein in a locked state of the parking brake, the brake piston is mechanically locked via the spindle device and the spring-loaded auxiliary piston, and in a released state of the parking brake, the auxiliary piston is blocked by means of the spring element and/or by means of the spindle device, and a device for preventing seizing of the spindle device which comprises both an element that protrudes from a head of the spindle device and an elastic element which are embodied by a stop including a first element, which is disposed on the head of the spindle device, and a second element, which is disposed on a housing part, and wherein in a stop position, the first element is in contact with a stop face perpendicular to a direction of rotation of the spindle device.

19. The parking brake in accordance with claim 18, wherein a height of the second element on the head of the spindle device is less than one thread pitch of the spindle device.

20. An automatic parking brake, including a brake piston, an auxiliary piston, a hydraulic chamber disposed between the brake piston and the auxiliary piston, a spring element, for prestressing the auxiliary piston, a spindle device connected to the auxiliary piston via a threaded connection, a drive for the spindle device, wherein in a locked state of the parking brake, the brake piston is mechanically locked via the spindle device and the spring-loaded auxiliary piston, and in a released state of the parking brake, the auxiliary piston is blocked by means of the spring element and/or by means of the spindle device, and a device for preventing seizing of the spindle device which comprises both an element that protrudes from a head of the spindle device and an elastic element wherein the protruding element is a ball.

* * * * *